UNITED STATES PATENT OFFICE.

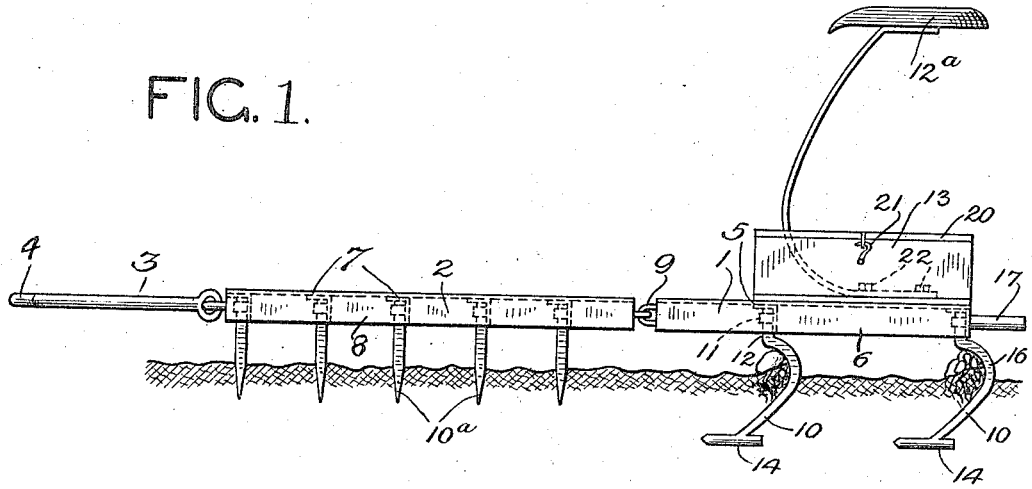
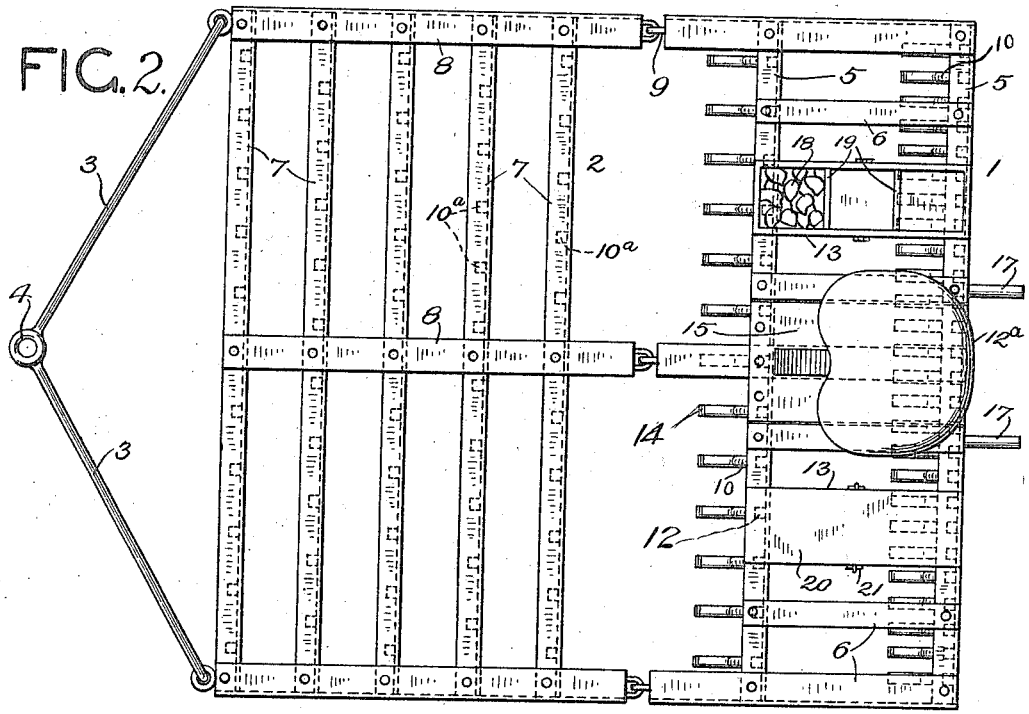

DOROTHEA ORT, OF BENSENVILLE, ILLINOIS.

AGRICULTURAL IMPLEMENT.

1,237,947. Specification of Letters Patent. Patented Aug. 21, 1917.

Application filed February 6, 1915. Serial No. 6,632.

*To all whom it may concern:*

Be it known that I, DOROTHEA ORT, a citizen of the United States, residing at Bensenville, in the county of Dupage and State of Illinois, have invented certain new and useful Improvements in Agricultural Implements, of which the following is a specification.

My invention relates to agricultural implements, and it has for its object the production of a machine that may be used as a rake, to rake through the soil beneath the surface thereof, for the purpose of raking from the earth objectionable substances, and depositing the same in windrows. Just as a rake is used on the surface of the earth to collect hay or other material in windrows, so the machine which I have invented is used to rake through the earth itself, to such depth as may be necessary, in order to rake or collect such material or substances as may be desired. For this reason I call the machine an underground rake.

At times the soil in certain localities is materially reduced in value by reason of the growth therein of objectionable roots; this is particularly the case with the roots of quack grass; and one of the purposes of my invention is to produce a machine which is capable of raking from the soil these objectionable roots.

The drawings attached hereto show, in Figure 1, a side elevation of one modification of a machine illustrating my invention, Fig. 2 shows a plan view of the same.

The machine which I have shown in this instance to illustrate my invention, consists of a frame, 1, hinged in any suitable manner to a frame, 2. The frame, 1, may be conveniently spoken of as the rear portion of the implement, and the frame, 2, as the front portion of the implement. The entire machine is adapted to be pulled by a team of horses or in any other suitable manner, hitched in the usual manner to the ring, 4, of the bars, 3, hinged in any suitable manner to the front portion of the machine. The rear frame, 1, comprises the transverse beams, 5, and the longitudinal connecting beams, 6. The front frame, 2, comprises similar transverse beams, 7, and longitudinal connecting beams, 8. The two frames are connected by means of the hinges, 9.

Projecting downwardly from the transverse beams, 5, are teeth, 10, fixed in any suitable manner to the beams. In this instance I have shown U bolts, 11, by means of which the teeth may be bolted to the downward projecting flanges of the L beams, 5. The shank, 12, of each tooth is square, and fits the square shaped loop of the bolt, 11. The teeth are thus prevented from rotating, but may be adjusted vertically. The rake teeth are curved in a suitable manner, as indicated in Fig. 1, and project downward a very material distance below the beams. Each rake tooth has a runner, 14, fixed to its lower end to regulate its depth. These runners are adapted to be horizontal at the proper depth. If the teeth tend to run deeper the runner will begin to slant upwardly and thus offset the downward tendency. Or if the teeth are too high the runners will slant downwardly, and will thus tend to force the teeth deeper.

The teeth in the rear beam, 5, are positioned close together, depending upon the nature of the work to be performed. The teeth of the forward beam, 5, are placed much farther apart.

Projecting downwardly from the beams, 7, of the front frame are teeth, 10$^a$, which may be of any suitable shape, and may be fastened to the transverse beams in any suitable manner. Herein I have shown these teeth as straight, and substantially the same as ordinary harrow teeth; and have shown them connected to the L transverse beams in a manner similar to that of the teeth of the rear frame. These straight teeth ordinarily are positioned farther apart than the teeth on the rear frame, and are adapted to pulverize the soil suitably for the work of the rear teeth, and to assist in loosening the material to be raked. On the rear frame is mounted in a suitable manner a seat, 12$^a$.

In the use of this machine for raking quack-grass roots, the soil to be raked is first put in a suitable condition by plowing, or otherwise, so as to loosen the roots from the ground, and put the ground in such condition that the teeth may pass readily therethrough. The machine is then dragged over the ground by horses, or in any other suitable manner, and the operator rides on the rear frame, or walks, according to the depth to which it is desired to force the teeth. The depth is also regulated, not only by the runners, 14, but also by any suitable weights. In this instance I use stones, 18, in boxes, 13;

the boxes having partitions, 19, and lids, 20, which are held closed by hooks, 21. These weights consisting of a plurality of pieces, more or less of the weights may be removed as the conditions may require, and if desired one row of teeth may be forced downward more than the other by placing in one end of the box more weights than in the other end. If desired the seat may be removed from the frame by merely unscrewing the nuts, 22, and the operator may stand on the platform, 15.

When thus operated the teeth of the forward frame more thoroughly pulverize the soil, break up the large lumps of dirt, and tear loose, more or less, the roots or other objectionable material, and loosen the roots from the soil.

The forward teeth of the rear frame also tend to assist in pulverizing the soil, and separating the roots therefrom. The rear row of teeth is forced into the ground a sufficient depth to cause the lower ends of the teeth to pass well below the roots lying in the soil; and the roots will pass upward to the rearmost portion, 16, of the teeth, substantially above the soil. When a sufficient amount has been collected in this manner, the operator, by means of the handles, 17, raises the frame from the ground, thus allowing the teeth to clear the windrows of roots, and he then again forces the teeth into the ground.

When the field has been thus raked, and the roots deposited in windrows, they are collected in any suitable manner, and the machine is then driven transversely of the field, along each of the windrows, so as to gather any of the roots that may have been left on the ground, or more particularly to gather those which were left in the ground when the rake was raised. In this manner the entire field may be thoroughly raked to any depth that may be desired, and no roots will be left in the ground.

I am well aware that pulverizers of various sorts have long been in use merely for placing the soil in better working condition, and more suitable for the crops, and I hereby disclaim any invention for that purpose alone. While incidentally the machine which I have described pulverizes the soil, such is not the principal purpose of the invention. And I also wish it to be understood that while I have described the machine for a particular purpose, and have shown with considerable definiteness the mechanism and the details thereof, yet the machine may be used for other similar purposes, and modifications thereof may be made by those familiar with the art without departing from the scope of the following claim.

I claim as my invention:

An underground rake comprising two frames connected one in the rear of the other; teeth projecting downwardly from each of said frames, the teeth of the forward frame being spaced farther apart than those of the rear frame, the teeth of the rear frame being arranged into two transverse rows, the teeth of the rear row being closer together than those of the forward row of the rear frame; the teeth of the rear frame being, substantially vertical, but being bowed rearwardly near the central portion thereof, and a runner fixed to the lower ends of each rear tooth and extending forwardly and rearwardly of the lower end of said tooth and parallel with the cross beams of the rear frame.

In testimony whereof I hereunto set my hand in the presence of two witnesses.

DOROTHEA ORT.

In the presence of—
E. L. FARRELL,
F. R. ANDREWS.

Copies of this patent may be obtained for five cents each, by addressing the "Commissioner of Patents, Washington, D. C."